United States Patent [19]

Nakashima et al.

[11] Patent Number: 5,840,805
[45] Date of Patent: Nov. 24, 1998

[54] ROOM-TEMPERATURE-CURABLE ORGANOPOLYSILOXANE COMPOSITIONS

[75] Inventors: Hisataka Nakashima, Fukuoka Prefecture; Shigeki Sugiyama, Chiba Prefecture, both of Japan

[73] Assignee: Dow Corning Toray Silicone Co., Ltd., Tokyo, Japan

[21] Appl. No.: 548,032

[22] Filed: Oct. 25, 1995

[30] Foreign Application Priority Data

Oct. 28, 1994 [JP] Japan ................................. 6-288930

[51] Int. Cl.$^6$ ........................................ C08K 5/24
[52] U.S. Cl. ................. 524/731; 524/730; 524/588; 524/425; 524/858; 524/863; 524/864; 524/788; 524/860; 524/424; 524/789; 524/448; 524/785; 524/449; 524/445; 524/431; 524/783; 524/437; 524/442; 525/104; 525/106; 525/479; 528/38; 528/40
[58] Field of Search ................. 524/588, 425, 524/788, 860, 424, 789, 448, 785, 449, 445, 431, 783, 430, 437, 442, 730, 731; 528/38, 40; 525/104, 106, 479

[56] References Cited

U.S. PATENT DOCUMENTS

| | | | |
|---|---|---|---|
| 3,457,214 | 7/1969 | Modic | 260/37 |
| 3,719,635 | 3/1973 | Clark et al. | 260/46.5 G |
| 3,907,742 | 9/1975 | Tanaka et al. | 260/375 B |
| 4,467,063 | 8/1984 | Lockhart | 524/106 |
| 4,667,012 | 5/1987 | Nasmussen et al. | 528/332 |
| 4,797,439 | 1/1989 | Peccoux | 524/188 |
| 5,064,898 | 11/1991 | Arai et al. | 524/780 |
| 5,580,943 | 12/1996 | Nakashima | 528/26 |
| 5,639,823 | 6/1997 | Adachi et al. | 524/864 |

FOREIGN PATENT DOCUMENTS

| | | |
|---|---|---|
| 0 210 442 | 2/1987 | European Pat. Off. . |
| 0210442 | 2/1987 | European Pat. Off. . |
| 0215215 | 3/1987 | European Pat. Off. . |
| 48-15962 | 2/1973 | Japan . |
| 49-2853 | 1/1974 | Japan . |
| 62-007763 | 1/1987 | Japan . |
| 62-1750 | 1/1987 | Japan . |

OTHER PUBLICATIONS

J49002853 Abstract
J62007763 Abstract

*Primary Examiner*—Melvyn I. Marquis
*Attorney, Agent, or Firm*—Roger H. Borrousch; Patricia M. Scaduto

[57] ABSTRACT

A highly storage-stable room-temperature-curable organopolysiloxane composition that cures to yield a product whose surface resists staining and that does not cause staining of the neighboring regions of the substrate in contact with said cured product. The organopolysiloxane composition is made from a polydiorganosiloxane, an imidazolinyl-functional organosiloxane, a filler, and a crosslinking compound which is a Si-bonded hydrolyzable group-containing organosilane or organosiloxane oligomer.

12 Claims, No Drawings

ROOM-TEMPERATURE-CURABLE ORGANOPOLYSILOXANE COMPOSITIONS

BACKGROUND OF THE INVENTION

1. Field of the Invention

This invention relates to room-temperature-curable organopolysiloxane compositions. More particularly, this invention relates to highly storage-stable room-temperature-curable organopolysiloxane compositions that cure to yield a product whose surface resists staining and that resists staining of the neighboring regions of the substrate in contact with the cured product.

2. Description of the Prior Art

Room-temperature- curable organopolysiloxane compositions that cure at room temperature to yield rubbery elastic materials are used in a wide range of applications as sealing materials, electric insulation, adhesives, and moldmaking and modelling materials. One example of these compositions consists of room-temperature-curable organopolysiloxane compositions comprising silanol-endblocked organopolysiloxane and Si-bonded hydrolyzable group-containing organosilicon compound as described in Japanese Patent Application Laid Open (Kokai or Unexamined) Number Sho 48-15962 (1973)(equivalent to U.S. Pat. No. 3,719,635, issued Mar. 6, 1973 to Clark et al and in Japanese Patent Application Laid Open (Kokai or Unexamined) Number Sho 49-2853 (1974). However, when these compositions are used as sealants, staining is produced both on the surface of the cured silicone rubber and in neighboring regions of the substrate in contact with the cured silicone rubber. Drying oil-containing room-temperature-curable organopolysiloxane compositions have been proposed in order to solve this problem as described in Japanese Patent Application Laid Open (Kokai or Unexamined) Number Sho 62-1750 (1987)(equivalent to European Patent Publication No. 210,442, published Feb. 2, 1987) and in Japanese Patent Application Laid Open (Kokai or Unexamined) Number Sho 62-7763 (1987) (equivalent to European Patent Publication No. 215,215, published Mar. 25, 1987), but these compositions have a critically deficient storage stability in that the organopolysiloxane and drying oil separate with the passage of time during storage of these compositions after their preparation.

SUMMARY OF THE INVENTION

Problems to Be Solved by the Invention The present invention was achieved by the present inventors as a result of extensive investigations directed to solving the problems described above.

In specific terms, the present invention takes as its object a highly storage-stable room-temperature-curable organopolysiloxane composition that cures to yield a product whose surface resists staining and also resists staining of the neighboring regions of the substrate in contact with said cured product.

Means Solving the Problems and Function Thereof

The present invention relates to a room-temperature-curable organopolysiloxane composition comprising (A) 100 parts by weight of a polydiorganosiloxane having silanol or a silicon-bonded hydrolyzable group at both molecular chain terminals, with the proviso that this polydiorganosiloxane does not contain an imidazolinyl radical bonded to silicon, (B) 1 to 100 parts by weight of an imidazolinyl-functional organosiloxane having per molecule at least one imidazolinyl radical of the following general formula bonded to silicon

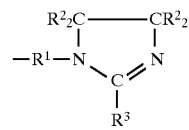

wherein $R^1$ is a $C_1$ to $C_{50}$ divalent hydrocarbon radical, each $R^2$ is selected from the group consisting of hydrogen atom and a $C_1$ to $C_{50}$ monovalent hydrocarbon radical, and $R^3$ is a $C_2$ to $C_{50}$ monovalent hydrocarbon radical with aliphatic unsaturation, (C) 10 to 1,000 parts by weight filler, and (D) 0.1 to 50 parts by weight Si-bonded hydrolyzable group-containing organosilane or organosiloxane oligomer.

DETAILED DESCRIPTION OF THE PREFERRED EMBODIMENTS

Component (A) is a polydiorganosiloxane having silanol or a silicon-bonded hydrolyzable group at both molecular chain terminals. The silicon-bonded hydrolyzable group is exemplified by acyloxy radicals such as acetoxy, octanoyloxy, benzoyloxy, and so forth; ketoximo radicals such as the dimethyl ketoximo radical, methyl ethyl ketoximo radical, diethyl ketoximo radical, and so forth; alkoxy radicals such as methoxy, ethoxy, propoxy, and so forth; alkenyloxy radicals such as isopropenyloxy, 1-ethyl-2-methylvinyloxy, and so forth; amino radicals such as dimethylamino, diethylamino, butylamino, cyclohexylamino, and so forth; aminoxy radicals such as dimethylaminoxy and so forth; and amide radicals such as N-methylacetamido, N-ethylacetamido, N-methylbenzamido, and so forth. However, both molecular chain terminals of this component preferably bear the silanol group. The silicon-bonded organic radicals present in polydiorganosiloxane (A) in addition to the silanol or silicon-bonded hydrolyzable groups may not include the imidazolinyl radical, but otherwise are exemplified by monovalent hydrocarbon radicals such as alkyl radicals such as methyl, ethyl, propyl, butyl, and so forth; cycloalkyl radicals such as cyclopentyl, cyclohexyl, and so forth; alkenyl radicals such as vinyl, allyl, and so forth; aryl radicals such as phenyl, tolyl, naphthyl, and so forth; and aralkyl radicals such as 2-phenylethyl and so forth. The molecular structure of this component is preferably straight chain or partially branched straight chain. The viscosity of this component at 25° C. is preferably in the range from 0.1 to 1,000 Pa.s and particularly preferably in the range from 1 to 100 Pa.s. The silicone rubber obtained by curing the composition of this invention will be brittle when this viscosity of (A) is below 0.1 Pa.s. On the other hand, at viscosities in excess of 1,000 Pa.s, the viscosity of the composition according to the present invention becomes excessively high and its processability or workability is reduced. (A) may also be a mixture of two or more organopolysiloxanes that differ in their molecular weights and/or type.

Component (B) is an imidazolinyl-functional organosiloxane that contains at least one siloxane unit with an imidazolinyl radical of the following general formula bonded to silicon:

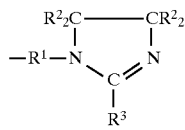

Component (B) provides the composition according to the present invention with a stain-resisting or antistaining character. $R^1$ in the preceding formula is a $C_1$ to $C_{50}$ divalent hydrocarbon radical, for example, an alkylene radical such as methylene, ethylene, propylene, butylene, and so forth, or an arylene radical such as phenylene, tolylene, xylylene, and so forth. $R^1$ is preferably selected from the group of $C_1$ to $C_8$ divalent hydrocarbon radicals. Each $R^2$ is hydrogen atom or independently selected from the group of $C_1$ to $C_{50}$ monovalent hydrocarbon radicals wherein said monovalent hydrocarbon radicals are exemplified by methyl, ethyl, and propyl. $R^2$ is preferably selected from hydrogen atom or a $C_1$ to $C_8$ monovalent hydrocarbon radical. $R^3$ is a $C_2$ to $C_{50}$ aliphatically unsaturated monovalent hydrocarbon radical, for example, vinyl, allyl, butenyl, heptadecenyl, heptadecadienyl, hexenyl, and dodecenyl. $R^3$ is preferably a $C_{10}$ to $C_{20}$ aliphatically unsaturated monovalent hydrocarbon radical. Preferred organosiloxanes are those which are mixtures where $R^3$ is a mixture of such $C_{10}$ to $_{20}$ aliphatically unsaturated monovalent hydrocarbon radicals. Other than imidazolinyl groups on the orgnaosiloxanes of (B), the groups are silanols and monovalent hydrocarbon radicals. Said monovalent hydrocarbon radicals are exemplified by alkyl radicals such as methyl, ethyl, propyl, butyl, and so forth; cycloalkyl radicals such as cyclopentyl, cyclohexyl, and so forth; alkenyl radicals such as vinyl, allyl, and so forth; aryl radicals such as phenyl, tolyl, naphthyl, and so forth; and aralkyl radicals such as 2-phenylethyl and so forth. The molecular chain terminals of this component are exemplified by silanol, trimethylsiloxy, and methyl ethyl ketoximo radicals. The siloxane unit degree of polymerization of this component preferably is in the range from 2 to 1,100. The molecular structure of this component may be straight chain or cyclic or a mixture thereof, but straight chain is preferred. The imidazolinyl-functional organosiloxane can be synthesized, for example, by a dehydration reaction between aminoalkyl-functional organosiloxane and carboxylic acid containing aliphatic hydrocarbon, e.g., acrylic acid, methacrylic acid, oleic acid, linoleic acid, linolenic acid, ricinoleic acid, and so forth. This method of synthesis of the imidazolinyl-functional organosiloxanes and various organosiloxanes are described in application Ser. No. 08/535,393, filed Sep. 28, 1995 now U.S. Pat. No. 5,580,943, and is hereby incorporated by reference. Component (B) is added at 1 to 100 parts by weight per 100 parts by weight of (A). The addition of less than 1 part by weight results in a weak antistaining performance for the surface of the silicone rubber yielded by curing the invention composition and at the neighboring regions of the substrate in contact therewith. The addition of more than 100 parts by weight produces the problem of discoloration of the surface of the cured silicone rubber.

Component (B) is specifically exemplified by organosiloxanes with the following formulas:

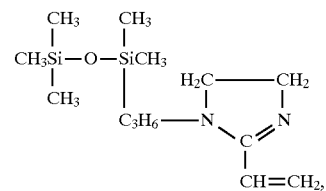

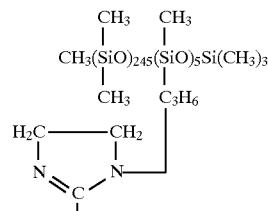

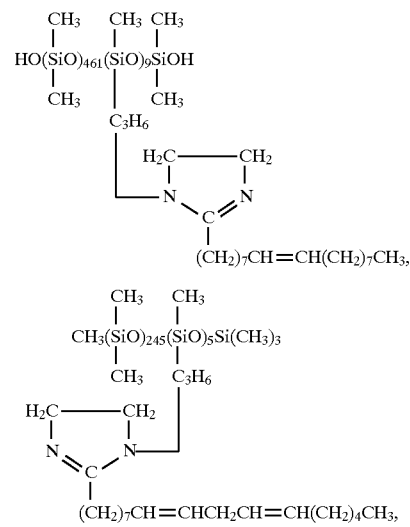

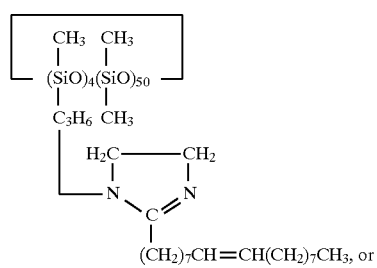

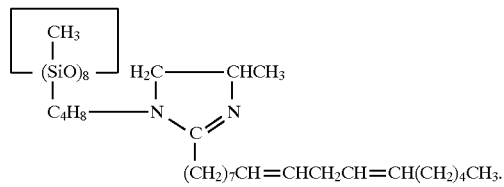

The filler of component (C) is used to impart advantageous properties to the composition and to the cured product thereof. Reinforcing filler is used to impart the required strength to the rubbery elastic material obtained by curing the composition according to the present invention. This component may be an inorganic filler or organic filler, but inorganic fillers are preferred. Component (C) is specifically exemplified by reinforcing fillers such as fumed silica, precipitated silica, and precipitated calcium carbonate (including colloid calcium carbonate). Extending fillers are exemplified by quartz, diatomaceous earth, titanium oxide, aluminum oxide, iron oxide, calcium oxide, ground calcium carbonate, mica, clay, carbon fiber, silicon carbide fiber, glass fiber, polyvinyl chloride beads, and polystyrene beads. Also usable are these fillers after a hydrophobicizing surface treatment with higher fatty acid or organosilane or organosiloxane oligomer, etc. Component (C) is added at 10 to 1,000 parts by weight per 100 parts by weight of (A). Preferably the amount of filler (C) is from 10 to 500 parts by weight per 100 parts by weight of (A), and more preferred are amounts of filler (C) of 10 to 200 parts by weight per 100 parts by weight of (A). When reinforcing filler is used the amount of filler is preferably 200 or less parts by weight per 100 parts by weight of (A) and more preferred 100 or less parts by weight of filler per 100 parts by weight of (A). The addition of less than 10 parts by weight results in a low strength for the rubber obtained by curing the composition according to the present invention, while the addition of more than 1,000 weight parts results in a poor processability or workability.

Component (D) is a silicon compound having Si-bonded hydrolyzable groups and can be an organosilane with hydrolyzable groups or an organosiloxane oligomer with hydrolyzable groups. Component (D) is a crosslinker that brings about formation of a rubbery elastic material by curing the composition according to the present invention. The organosilane or organosiloxane oligomer preferably contains at least 2 silicon-bonded hydrolyzable groups in each molecule and more preferably contains at least 3 such groups. Silicon-bonded hydrolyzable groups are exemplified by acyloxy radicals such as acetoxy, octanoyloxy, benzoyloxy, and so forth; ketoximo radicals such as the dimethyl ketoximo radical, methyl ethyl ketoximo radical, diethyl ketoximo radical, and so forth; alkoxy radicals such as methoxy, ethoxy, propoxy, and so forth; alkenyloxy radicals such as isopropenyloxy, 1-ethyl-2-methylvinyloxy, and so forth; amino radicals such as dimethylamino, diethylamino, butylamino, cyclohexylamino, and so forth; aminoxy radicals such as dimethylaminoxy and so forth; and amide radicals such as N-methylacetamido, N-ethylacetamido, N-methylbenzamido, and so forth. In addition to the hydrolyzable groups, other groups bonded to the orgnaosilane or organosiloxane oligomer can be silanols or silicon-bonded organic radicals exemplified by monovalent hydrocarbon radicals such as alkyl radicals such as methyl, ethyl, propyl, butyl, and so forth; cycloalkyl radicals such as cyclopentyl, cyclohexyl, and so forth; alkenyl radicals such as vinyl, allyl, and so forth; aryl radicals such as phenyl, tolyl, naphthyl, and so forth; and aralkyl radicals such as 2-phenylethyl and so forth. Component (D) may also be a mixture of two or more organosilanes or organosiloxane oligomers. The molecular structure of the organosiloxane oligomers used as this component may be straight chain, branched, or cyclic. Component (D) is added at amounts of from 0.1 to 50 parts by weight per 100 parts by weight component (A) and preferably at 1 to 20 parts by weight per 100 parts by weight component (A). Curing becomes inadequate at less than 0.1 part by weight, which prevents the preparation of a silicone rubber having the desired properties. At additions in excess of 50 parts by weight, one encounters a large shrinkage during curing, as well as, such problems as a long cure time and a decline in the post-cure properties.

Component (D) is specifically exemplified by organosilanes such as methyltrimethoxysilane, methyltriethoxysilane, vinyltrimethoxysilane, methylphenyldimethoxysilane, 3,3,3-trifluoropropyltrimethoxysilane, methyltriacetoxysilane, vinyltriacetoxysilane, phenyltripropionoxysilane, ethyltris(N,N-diethylamino)silane, vinyltris(N-methyl-N-cyclohexylamino)-silane, dimethylbis(N,N-dibutylamino)silane, methyltris(N-methylacetamido)silane, methylvinylbis(N-ethylacetamido)silane, vinyltris(N-ethylacetamido)silane, methyltris(N,N-diethylaminoxy)silane, phenyltris(N,N-diethylaminoxy)silane, methyltris(methyl ethyl ketoximo)silane, vinyltris(methyl ethyl ketoximo)silane, 3,3,3-trifluoropropyltris(methyl ethyl ketoximo)silane, methyltris(isopropenoxy)silane, vinyltris(isopropenoxy) silane, tetramethoxysilane, tetraethoxysilane, tetra(n-propoxy)silane (isopropenoxy) silane, and so forth and organosiloxane oligomers by the partial hydrolyzates of the preceding, and also by ethylpolysilicate, n-propyl polysilicate, dimethyltetraacetoxydisiloxane, pentamethyltris(N,N-diethylaminoxy)cyclotetrasiloxane, and hexamethylbis(N,N-diethylaminoxy)cyclotetrasiloxane.

The composition according to the present invention comprising components (A), (B), (C), and (D) cures upon standing at room temperature when exposed to moisture; however, in some cases an inadequate cure will be obtained as a function of the particular component (D) used. It is preferable in such cases to add a curing catalyst, a component (E), in order to accelerate the condensation reaction between components (A) and (D) and thereby accelerate the cure of the composition while at the same time bringing the cure to completion. Generally usable as curing catalysts are the condensation reaction catalysts known for use in room-temperature-curable organopolysiloxane compositions. Examples thereof are the metal salts of carboxylic acids, such as dibutyltin diacetate, dibutyltin dioctate, dibutyltin dilaurate, cobalt naphthoate, tin octoate, iron octoate, manganese octoate, and so forth; metal alcoholates such as tetrabutyl titanate, tetraisopropyl titanate, bis(acetylacetonyl)diisopropyltitanate, tetrabutyl zirconate, and so forth; and amine compounds such as guanidine, and so forth. This component is added at 0.001 to 10 parts by weight per 100 parts by weight component (A).

Although the composition according to the present invention comprises components (A) to (D) or (A) to (E) as described above, it may also contain those additives known for use in room-temperature-curable organopolysiloxane compositions insofar as the object of the present invention is not impaired. Said additives are exemplified by pigments such as iron oxide red, titanium dioxide, zinc white, ultramarine, iron black, carbon black, and so forth; fluidity adjusters; antimold agents; organic solvents; surfactants; adhesion promoters; flame retardants; and so forth.

The composition according to the present invention can be prepared simply by mixing components (A) to (D) or (A) to (E) and any optional additives to homogeneity, preferably in the absence of moisture if the composition is to be packaged and stored for a period of time for later use.

The composition according to the present invention as described above is characterized by an excellent storage stability. Another characteristic feature of this composition is that, after its cure, staining does not quickly develop on the surface of its cured product or on neighboring regions of the substrate in contact with said cured product. This makes the composition according to the present invention highly qualified for use as a sealing material for the outer wall joints of buildings, where such a feature is critical.

The present invention is explained in greater detail below through working examples. In the working and comparative examples, the viscosity is the value measured at 25° C. and "parts" denotes "parts by weight". The resistance to staining was measured by the following method.

Resistance to staining

A room-temperature-curable organopolysiloxane composition was filled into a joint (joint width=20 mm, joint depth=10 mm) formed by abutting 2 white ceramic boards. Curing at 25° C. for 1 month formed a test panel. This test panel was thereafter held outdoors at an inclination of 75° with the joint on the upper side, and the development of staining on the ceramic board in the vicinity of the joint and on the surface of the cured silicone rubber was evaluated. The evaluations were made immediately after curing and thereafter at 1-month intervals over a total time period of 3 months. The results of the evaluations were as reported according to the following scale:

++=no appearance of staining
+=appearance of slight staining
x=appearance of moderate staining
xx=appearance of substantial staining

REFERENCE EXAMPLE 1

While operating under a nitrogen current, 249.9 g amino-functional organosiloxane with the formula (amino value as NH=0.89%)

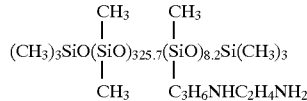

and 37.1 g xylene were introduced into a 1-L separable flask equipped with stirrer, thermometer, and a water-measurement tube fitted with a reflux condenser and were stirred. The resulting mixture was then heated to reflux at 160° C. Separately, 20.7 g mixed fatty acid, Hy-Diene, containing 58 to 65 weight percent of conjugated linoleic acid, 27 to 35 weight percent of non-conjugated linoleic acid, 3 to 7 weight percent oleic acid, 3 to 5 weight percent ricinoleic acid, 1 to 2 weight percent of palmitic acid, and 1 to 2 weight percent of stearic acid (neutralization value= 198.3, brand name: Hy-Diene from KF Trading Company, Tokyo, Japan) was weighed into an addition funnel, which was then installed on the 1-L separable flask. This mixed fatty acid was subsequently added dropwise over 1.3 hours at 160° C. into the mixture of amino-functional organosiloxane and xylene. After the completion of this addition, the dehydration reaction was completed by stirring for 4.6 hours at 160° C. to 179° C., after which interval 2.0 mL water had distilled into the water-measurement tube. The resulting reaction mixture was then cooled to room temperature, combined with 20 g filtration aid (brand name: Radiolite 900 from Showa Kagaku Kogyo Kabushiki Kaisha, Tokyo, Japan) and 146.3 g toluene, stirred for 30 minutes, and finally subjected to fine filtration. After filtration, the solvent in the filtrate was stripped off at 70° C./30 mmHg for 1 hour and then at 72° C./8 mmHg to 80° C./10 mmHg for 4 hours to give 238.9 g imidazolinyl-functional organosiloxane with the following formula.

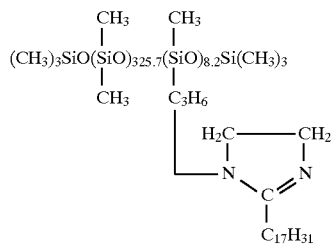

The —$C_{17}H_{31}$ radical shown in the formulas of the examples represents the reacted residue from the Hy-Diene acid mixture as determined from the molecular weight.

Analysis of this organosiloxane by $^{13}$C-nuclear magnetic resonance analysis ($^{13}$C-NMR) confirmed the presence of the signal for the imino group carbon in the imidazoline ring at 167.1 ppm. Analysis of this organosiloxane by infrared absorption spectroscopy confirmed the presence of the imino group signal at 1,620 cm$^{-1}$.

REFERENCE EXAMPLE 2

While operating under a dry nitrogen current, 103.8 g cyclic amino-functional organosiloxane of the formula (amino value as NH=18.2 weight %):

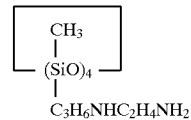

and 41.5 g xylene were introduced into a 0.3-L flask equipped with stirrer, thermometer, and water-measurement tube fitted with a reflux condenser and were stirred. The resulting mixture was then heated to reflux at 1450. Separately, 140.9 g mixed fatty acid Hy-Diene as described in Reference Example 1, was weighed into an addition funnel, which was then installed on the 0.3-L flask. This mixed fatty acid was subsequently added dropwise over 2.2 hours at 145° to 154° C. into the mixture of cyclic amino-functional organosiloxane and xylene. After the completion of this addition, the dehydration reaction was completed by stirring for 5.3 hours at 154° C. to 190° C., after which interval 18.0 mL water had distilled into the water- measurement tube. The resulting reaction mixture was then cooled to room temperature, combined with 20 g filtration aid (Radiolite 900 as described in Reference Example 1) and 122.8 g toluene, stirred for 30 minutes, and finally subjected to fine filtration. After filtration, the solvent in the filtrate was stripped off at 70° C./30 mmHg for 1.5 hours and then at 70° C./8 mmHg to 80° C./10 mmHg for 4 hours to give 207.1 g of a cyclic imidazolinyl-functional organosiloxane with the following formula:

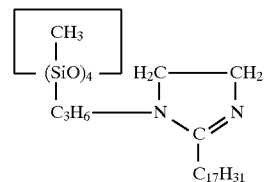

Analysis of this organosiloxane by $^{13}$C-NMR confirmed the presence of the signal for the imino group carbon in the imidazoline ring at 166.1 ppm. Analysis of the organosiloxane by infrared absorption spectroscopy confirmed the presence of the imino group signal at 1,610 cm$^{-1}$.

134.9 g a mixture of dimethylpolysiloxane cyclics with the formula

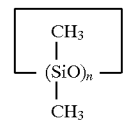

in which n=4 to 20, 66.8 g toluene, and 15.2 g imidazolinyl-functional organosiloxane cyclic as prepared herein were introduced into a 0.5-L separable flask equipped with stirrer and thermometer and were stirred. This stirring was followed by the addition of 46 microliters 50% aqueous cesium hydroxide solution, 112 microliters water, 3.5 g dimethyl sulfoxide, and 6.9 g tetrahydrofuran, and the reaction was then heated and stirred for 9.8 hours at 80° C. to 112° C. After cooling to 53° C., 23 microliters trimethylchlorosilane was added and the reaction was stirred for 2.2 hours at 53° C. to 44° C. The resulting reaction mixture was cooled to room temperature, and the low-boiling components were then distilled off at 32° C./24 mmHg to 60° C./24 mmHg. This distillation was followed by the addition of 125.8 g toluene and 11.8 g filtration aid (Radiolite 900 as described in Reference Example 1), stirring for 30 minutes, and finally a fine filtration. After filtration, the filtrate was stripped for 3.3 hours at 63° C./11 mmHg to 63° C./15 mmHg to give 123.1 g imidazolinyl-functional organosiloxane with the following formula.

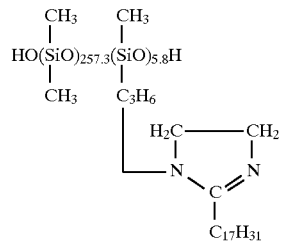

Analysis of this imidazolinyl-functional organosiloxane by $^{13}$C-NMR confirmed the presence of the signal for the imino group carbon in the imidazoline ring at 167.0 ppm. Analysis of this organosiloxane by infrared absorption spectroscopy confirmed the presence of the imino group signal at 1,620 cm$^{-1}$.

REFERENCE EXAMPLE 3

134.3 g a mixture of dimethylpolysiloxane cyclics with the formula

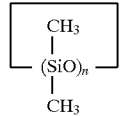

in which n=4 to 20, 70.5 g toluene, and 15.2 g imidazolinyl-functional organosiloxane cyclic as prepared in Reference Example 2 were introduced into a 0.5-L separable flask equipped with stirrer and thermometer and were stirred. This stirring was followed by the addition of 44 microliters 50% aqueous cesium hydroxide solution, 0.71 mL methyl ethyl ketoxime, 3.4 g dimethyl sulfoxide, and 6.9 g tetrahydrofuran, and the reaction was then heated and stirred for 5.8 hours at 80° C. to 110° C. 120 microliters water was added due to thickening of the mixture during stirring. After cooling to room temperature, 52.9 g toluene and 23 microliters trimethylchlorosilane were added and the reaction mixture was stirred for 1 hour at 57° C. to 59° C. After this stirring, a reflux condenser-equipped water-measurement tube was attached, heating under reflux was carried out for 23 minutes at 108° C. to 111° C., and an azeotropic dehydration was then conducted. The resulting reaction mixture was cooled to room temperature, combined with 11.3 g filtration aid ( Radiolite 900 as described in Reference Example 1), stirred for 30 minutes, and finally subjected to a fine filtration. After filtration, the filtrate was stripped for 2.5 hours at 60° C./8 mmHg to 60° C./21 mmHg to give 125.5 g imidazolinyl-functional organosiloxane with the following formula.

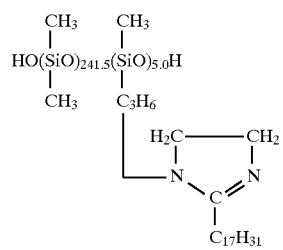

Analysis of this imidazolinyl-functional organosiloxane by $^{13}$C-NMR confirmed the presence of the signal for the imino group carbon in the imidazoline ring at 167.1 ppm. Analysis of this organosiloxane by infrared absorption spectroscopy confirmed the presence of the imino group signal at 1,620 cm$^{-1}$.

EXAMPLE 1

A room-temperature-curable organopolysiloxane composition was prepared by mixing the following under anhydrous conditions: 100 parts silanol-endblocked polydimethylsiloxane with a viscosity of 20 Pa.s, 17.2 parts imidazolinyl-functional organosiloxane as prepared in Reference Example 1, 117 parts colloidal calcium carbonate (a precipitated calcium carbonate having an average particle size=0.1 micron) whose surface had been hydrophobicized with higher fatty acid, and 16.1 parts vinyltris(methyl ethyl ketoximo)silane. The ability of the resulting composition to resist staining was evaluated, and these results were as reported in the Table. In addition, the appearance of this composition was evaluated after it had been held for 3 months at room temperature: no separation or sedimentation was observed after this 3-month period of storage under anhydrous conditions.

EXAMPLE 2

A room-temperature-curable organopolysiloxane composition was prepared by mixing the following under anhydrous conditions: 100 parts silanol-endblocked polydimethylsiloxane with a viscosity of 20 Pa.s, 17.2 parts imidazolinyl-functional organosiloxane as prepared in Reference Example 2, 117 parts colloidal calcium carbonate (a precipitated calcium carbonate having an average particle size=0.1 micron) whose surface had been hydrophobicized with higher fatty acid, and 16.1 parts vinyltris(methyl ethyl ketoximo)silane. The ability of the resulting composition to resist staining was evaluated, and these results were as reported in the Table. In addition, the appearance of this composition was evaluated after it had been held for 3 months at room temperature: no separation or sedimentation was observed after this 3-month period storage under andydrous conditions.

EXAMPLE 3

A room-temperature-curable organopolysiloxane composition was prepared by mixing the following under anhydrous conditions: 100 parts silanol-endblocked polydimethylsiloxane with a viscosity of 20 Pa.s, 17.2 parts imidazolinyl-functional organosiloxane as prepared in Reference Example 3, 117 parts colloidal calcium carbonate (a precipitated calcium carbonate having an average particle size=0.1 micron) whose surface had been hydrophobicized with higher fatty acid, and 16.1 parts vinyltris(methyl ethyl ketoximo)silane. The ability of the resulting composition to resist staining was evaluated, and these results were as reported in the Table. In addition, the appearance of this composition was evaluated after it had been held for 3 months at room temperature: no separation or sedimentation was observed after this 3-month period storage under anhydrous conditions.

EXAMPLE 4

A room temperature curable polydimethylsiloxane composition was made under anhydrous conditions through the process of mixing to homogeneity 90 parts of alpha, omega-hydroxyl terminated polydimethylsiloxane having a vicosity of 15 Pa.s, 10 parts of imidazolinyl-functional organosiloxane as described in Reference Example 3, 100 parts of colloidal calcium carbonate (a precipitated calcium carbonate having an average particle size of 0.1 mircon), 16 parts of methyltris(methyl ethyl ketoximo)silane, and 0.3 part of dibutyltin dioctoate. The ability of the resulting composition to resist staining was evaluated amd the results were as shown in the Table.

COMPARATIVE EXAMPLE

A room-temperature-curable organopolysiloxane composition was prepared as in Example 1, but in this case without the addition of the imidazolinyl-functional organosiloxane from Reference Example 1 that was used in Example 1. The ability of the resulting composition to resist staining was evaluated, and these results were as reported in the Table.

TABLE

| Resistance to Staining | Example 1 | Example 2 | Example 3 | Example 4 | Comparative Example |
|---|---|---|---|---|---|
| on the rubber surface | | | | | |
| immediately after curing | ++ | ++ | ++ | ++ | ++ |
| after 1 month | ++ | ++ | ++ | ++ | + |
| after 2 months | + | ++ | ++ | ++ | x |
| after 3 months | + | + | + | + | xx |
| in the vicinity of the joint | | | | | |
| immediately after curing | ++ | ++ | ++ | ++ | ++ |
| after 1 month | ++ | ++ | ++ | ++ | + |
| after 2 months | + | ++ | ++ | ++ | xx |
| after 3 months | x | + | + | + | xx |

Effects of the Invention

The room-temperature- curable organopolysiloxane composition according to the present invention is characterized by an excellent storage stability and by the fact that staining is slow to develop on the surface of its cured product or on neighboring regions of the substrate in contact with said cured product. These characteristic features occur because this composition comprises the components (A) to (D) or (A) to (E) as described above and in particular as a consequence of the presence of the imidazolinyl-functional organosiloxane constituting component (B).

That which is claimed is:

1. A room-temperature-curable organopolysiloxane composition comprising a composition obtained by mixing
   (A) 100 parts by weight of a polydiorganosiloxane having silanol or a silicon-bonded hydrolyzable group at both molecular chain terminals, with the proviso that this polydiorganosiloxane does not contain an imidazolinyl radical bonded to silicon,
   (B) 1 to 100 parts by weight of an imidazolinyl-functional organopolysiloxane having per molecule at least one imidazolinyl radical of the following general formula bonded to silicon

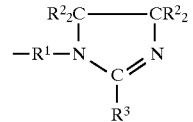

wherein $R^1$ is a $C_1$ to $C_{50}$ divalent hydrocarbon radical, each $R^2$ is selected from the group consisting of hydrogen atom and a $C_1$ to $C_{50}$ monovalent hydrocarbon radical, and $R^3$ is a $C_2$ to $C_{50}$ monovalent hydrocarbon radical with aliphatic unsaturation,
   (C) 10 to 1,000 parts by weight filler, and
   (D) 0.1 to 50 parts by weight Si-bonded hydrolyzable group-containing organosilane or organosiloxane oligomer.

2. A room-temperature-curable organopolysiloxane composition according to claim 1 further comprising (E) 0.001 to 10 parts by weight of curing catalyst.

3. The room-temperature-curable organopolysiloxane composition according to claim 1 in which the imidazolinyl-functional organopolysiloxane of (B) has from 2 to 1,100 siloxane units per molecule.

4. The room-temperature-curable organopolysiloxane composition according to claim 2 in which the imidazolinyl-functional organopolysiloxane of (B) has from 2 to 1,100 siloxane units per molecule.

5. The room-temperature-curable organopolysiloxane composition according to claim 1 in which (C) is present in an amount of from 10 to 500 parts by weight.

6. The room-temperature-curable organopolysiloxane composition according to claim 5 in which (C) is present in an amount of from 10 to 200 parts by weight.

7. The room-temperature-curable organopolysiloxane composition according to claim 2 in which (C) is present in an amount of from 10 to 500 parts by weight.

8. The room-temperature-curable organopolysiloxane composition according to claim 7 in which (C) is present in an amount of from 10 to 200 parts by weight.

9. The room-temperature-curable organopolysiloxane composition according to claim 3 in which (C) is present in an amount of from 10 to 500 parts by weight.

10. The room-temperature-curable organopolysiloxane composition according to claim 9 in which (C) is present in an amount of from 10 to 200 parts by weight.

11. The room-temperature-curable organopolysiloxane composition according to claim 4 in which (C) is present in an amount of from 10 to 500 parts by weight.

12. The room-temperature-curable organopolysiloxane composition according to claim 11 in which (C) is present in an amount of from 10 to 200 parts by weight.

* * * * *